L. C. WEST.
Brake for Baby-Carriages.
No. 218,909.     Patented Aug. 26, 1879.
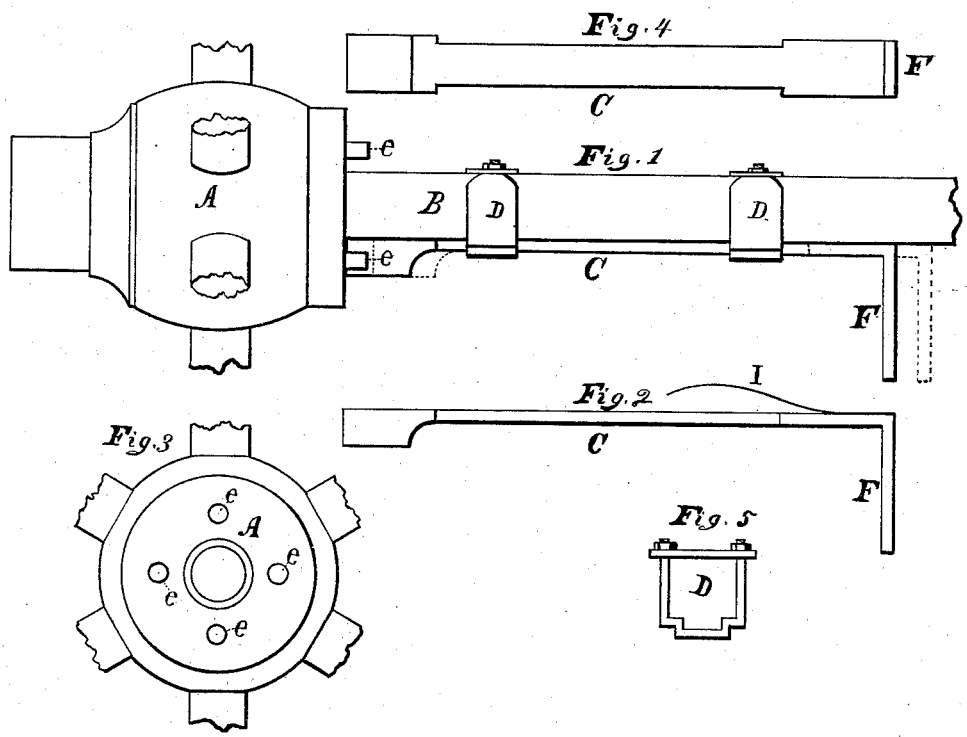
Attest:
J. C. Perkins.
E. W. Ansted.
Inventor:
Lucius C. West.

UNITED STATES PATENT OFFICE.

LUCIUS C. WEST, OF KALAMAZOO, MICHIGAN.

IMPROVEMENT IN BRAKES FOR BABY-CARRIAGES.

Specification forming part of Letters Patent No. 218,909, dated August 26, 1879; application filed May 31, 1878.

*To all whom it may concern:*

Be it known that I, LUCIUS C. WEST, of Kalamazoo, in the county of Kalamazoo and State of Michigan, have invented a new and useful Improvement in Brakes or Stops for Children's Carriages, of which the following is a specification.

My improvements relate to that class of stops which are provided with a sliding bolt interlocking with the wheel.

The object of my invention is to provide means whereby said stops may be quickly and cheaply adjusted to children's carriages, and which may be conveniently operated by the foot or hand.

The improvement consists in pins or screws driven into the end of the hub, or projections may be made on the hub-box for the purpose of interlocking the bolt with the wheel. These pins or projections are deemed preferable to other devices on account of cheapness and speedy adjustment, and, besides, less attention of the operator is required to interlock the bolt, it being a non-self-locker.

A handle is attached to the end of the bolt, extending from it at right angles, to operate it by, and a flat spring is secured to the bolt at one end, and running parallel with and between it and the axle of the carriage, to hold it from rattling or jarring out of place.

The bolt I adjust to the back side of the rear axle near one of the wheels, as shown in the drawings, by means of slotted clip.

In the accompanying drawings, forming a part of this specification, Figure 1 is a perspective of a device embodying my improvements. Fig. 2 shows side view of bolt; Fig. 3, end view of hub; Fig. 4, surface view of bolt, and Fig. 5 a slotted clip.

F is the handle attached to the bolt C, and I the spring secured to the same. B is the axle, and D the clips. A is the hub, into which are driven the pins or screws $e\ e$; or, if desirable, when the brakes are manufactured with the carriages, projections of a suitable nature may be formed on the box of the wheel-hub.

To operate a device provided with my improvements, hit the toe, after stopping the carriage, against the handle F, when the bolt C is thrown out against the wheel, with which it is interlocked by means of the pins $e\ e$, as shown in Fig. 3.

To remove the action of the bolt, hit the foot against the handle F, throwing the bolt C in position designated by dotted lines in Fig. 1.

What I claim is—

In combination with axle B of a baby-carriage, the clips D and sliding bolt C, provided with handle F and spring I, and adapted to engage projections on the hub A, substantially as described, and for the purpose set forth.

LUCIUS C. WEST.

Attest:
G. C. PERKINS,
E. W. ANSTED.